United States Patent Office 3,504,602
Patented Apr. 7, 1970

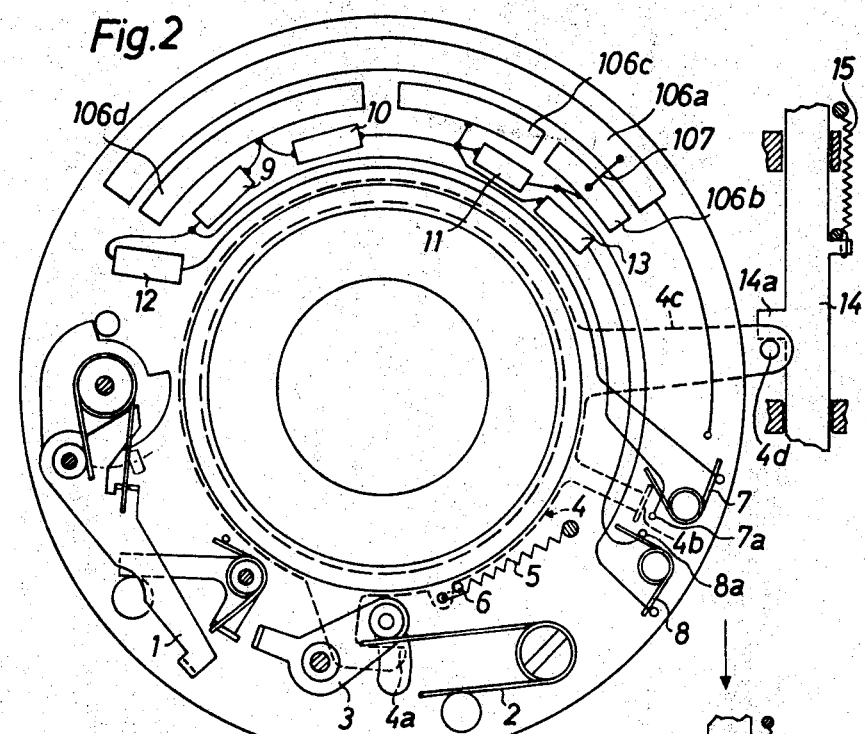
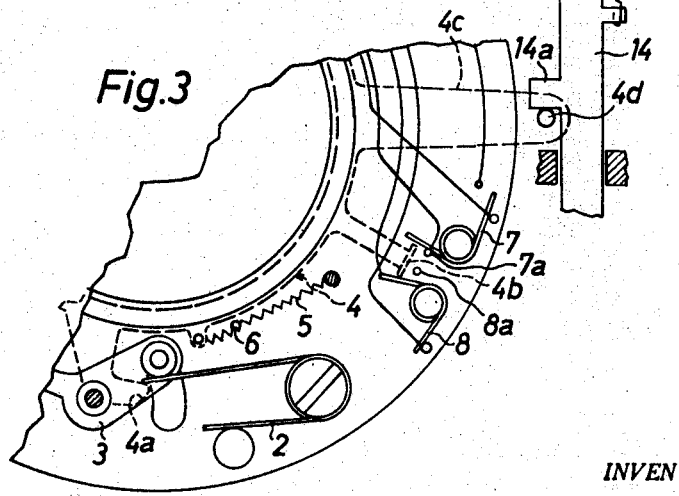

3,504,602
CAMERA FOR OPERATION WITH DIFFERENT SOURCES OF ARTIFICIAL LIGHT
Gerd Kiper, Dieter Engelsmann, and Günter Fauth, Unterhaching, Horst Karl, Munich, and Helmut Nusser, Grafing-Stadt, Germany, assignors to Agfa-Gevaert Aktiengesellschaft, Leverkusen, Germany
Filed July 10, 1967, Ser. No. 652,347
Claims priority, application Germany, July 21, 1966, A 53,066
Int. Cl. G03b 7/16
U.S. Cl. 95—10                                    16 Claims

ABSTRACT OF THE DISCLOSURE

A camera with built-in exposure meter which is designed to operate with two or more sources of artificial light. The output member of the exposure meter is connected with a light-sensitive element for operation in daylight and with a variable resistor in automatic response to placing of a source of artificial light into operative position. The resistor can furnish a different range of resistances for each guide number and comprises a series of fixed resistances. The number of resistances which are connected in circuit with the output member is variable as a function of the distance from the subject. The exposure time can be set in automatic response to placing of a source into operative position.

BACKGROUND OF THE INVENTION

The present invention relates to improvements in photographic cameras for use with two or more detachable or built-in sources of artificial light and with automatic adjustment of the diaphragm.

It is already known to provide a camera with an automatic exposure meter which adjusts or permits adjustment of the diaphragm as a function of the intensity of scene light when the camera is used for daylight photography, and to provide the camera with means for adjusting the size of the diaphragm aperture as a function of the distance from the subject or scene when the camera is used in artificial light. Such cameras are provided with a light-sensitive resistor or cell which is connected in circuit with the moving coil instrument of the exposure meter when the picture is to be taken in daylight, and with one or more auxiliary resistors which are connected in the circuit of the moving coil instrument when the camera is used in artificial light. The means for connecting the moving coil instrument with the light-sensitive element or with the auxiliary resistor or resistors comprises a manually operable actuating member. It is also known to employ an actuating member which is caused to connect the moving coil instrument with the light-sensitive element or with one or more auxiliary resistors in automatic response to placing of a source of artificial light into inoperative and operative position. For example, the actuating member can receive motion from a part which changes position in response to attachment or detachment of a flash unit. However, all such presently known constructions will operate properly only if the camera is used with a source of artificial light having a given guide number. In order to operate with different sources of artificial light, i.e., with sources whose guide numbers are not identical, it is necessary to provide the camera with further resistor means which are connected into or disconnected from the circuit of the moving-coil instrument whenever the operator decides to replace a first source of artificial light having a first guide number with a second source having a different guide number. A serious drawback of such cameras is that they are too complicated, too expensive, prone to malfunction, and cannot effect automatic adjustment for operation with sources of artificial light having different guide numbers. In other words, it is necessary to perform at least two manipulations whenever the operator wishes to switch from operation with a source of artificial light having a first guide number to operation with a source whose guide number is different from the first number.

SUMMARY OF THE INVENTION

It is an important object of our invention to provide a photographic camera which can be used with two or more sources of artificial light having different guide numbers and to construct and assemble the camera in such a way that the operator need not perform any additional steps or manipulations for the sole purpose of taking into consideration the guide number of at least one source.

Another object of the invention is to provide a camera of the just outlined character with means for automatically changing the exposure time in response to attachment or activation of at least one source of artificial light.

A further object of the invention is to provide a camera which can be used with electronic flash units, multiple flash bulb holders or flash guns having different guide numbers.

An additional object of the invention is to provide a camera which can be used with two or more sources of artificial light of the same type but having different guide numbers, for example, with two electronic flash units having different guide numbers.

Briefly outlined, one feature of our invention resides in the provision of a combination embodied in a camera which can be utilized with two or more different sources of artificial light, for example, with a built-in source which utilizes single flash bulbs or multiple flash bulb holders and with an electronic flash unit whose guide number is different from that of the built-in source. Each such source is movable, in its entirety or in part, between an operative and an inoperative position; for example, the electronic flash unit can be attached to or detached from the camera body and a flash bulb or a multiple flash bulb holder can be inserted into or removed from a socket in or on the camera body.

The camera comprises exposure meter means including an electric circuit which comprises an output member (for example, the needle of a moving coil instrument) movable between a plurality of positions each of which is indicative of a different size of the diaphragm aperture, light-sensitive means (including a cell or a resistor and a source of electrical energy) connectable with the output member to determine the latter's position as a function of the intensity of scene light when the camera is used in daylight, and variable resistor means for furnishing a plurality of resistance ranges, one for each guide number. The resistor means is connectable with the output member to provide a resistance in the appropriate range and to determine the position of the output member during operation in artificial light as a function of the guide number of the respective source and as a function of the distance from the subject. The camera further comprises resetting means for automatically disconnecting the output member from the light-sensitive means and for connecting the output member with the resistor means in response to movement of the respective source to operative position.

The novel features which are considered as characteristic of the invention are set forth in particular in the appended claims. The improved camera itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 2 is a fragmentary front elevational view of the shutter and certain other components in a camera which embodies the circuit of FIG. 1;

FIG. 3 illustrates a portion of the structure shown in FIG. 2 but with the camera set for operation with a built-in source of artificial illumination.

DESCRIPTION OF THE PREFERRED EMBODIMENTS

Figure 1:
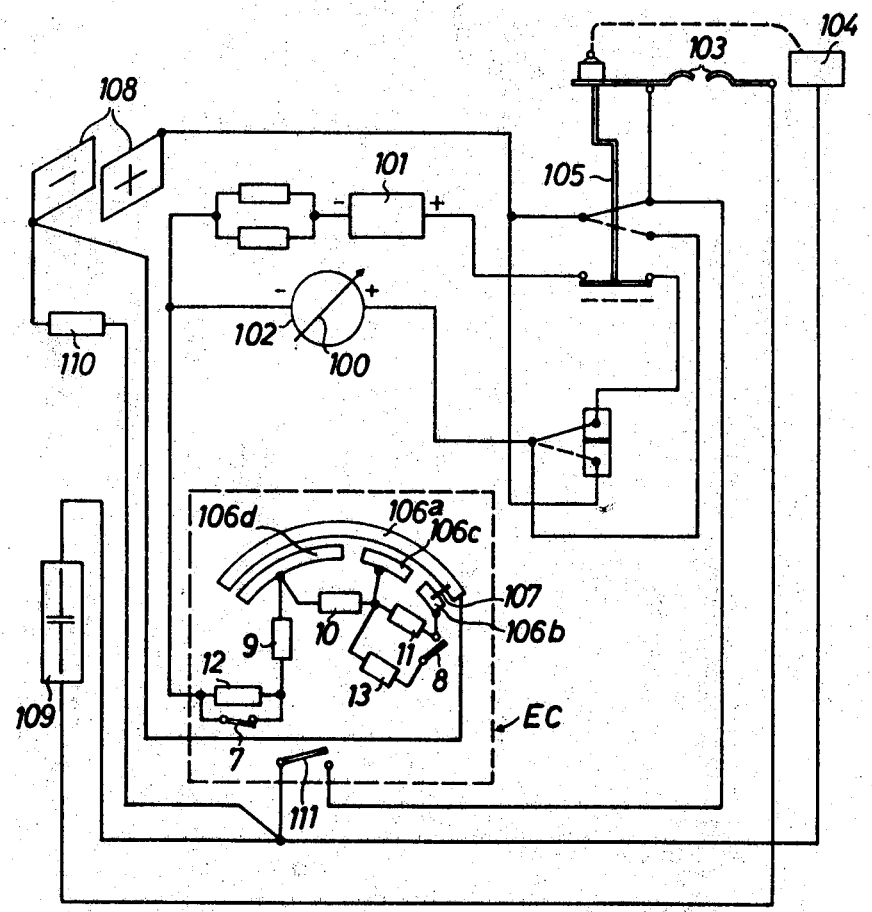
FIG. 1 is a diagram showing the electric circuit of a camera for use with electronic flash units and multiple flash bulb holders.

Referring first to FIG. 1, there is shown the electric circuit of a photographic camera which can be utilized to make exposures with different types of artificial light, for example, with an electronic flash unit and with a second flash unit employing multiple flash bulb holders of the type known as "Flashcubes." The camera comprises an automatic exposure meter including a moving coil instrument 102 provided with a needle-like output member 100 whose position is indicative of the optimum size of the diaphragm aperture and whose position can be scanned by a tracking mechanism which can adjust the diaphragm in a manner well known from the art of cameras. The moving coil instrument 102 is shown in circuit with a light-sensitive element 101 which may be constituted by a resistor or by a cell. A first socket 103 forms part of a built-in flash unit and serves to accommodate the plug of a multiple flash bulb holder. A second socket 104 serves to receive the complementary part of an electronic flash unit. A resetting member 105 is displaced in response to attachment of a source of artificial light (either a multiple flash bulb holder or an electronic flash unit) in such a way that the light-sensitive element 101 is replaced by a variable resistor including several fixed resistors 9 to 13. These resistors can be connected in circuit with the moving coil instrument 102 by means of fixed conductor rails 106a–106d and a movable adjusting member here shown as a slider 107 of conductive material. The slider 107 is connected with the focus adjusting means of the camera. Thus, when the camera is to be used in artificial light, the angular position of the output member 100 will be a function of the resistance offered by one or more fixed resistors 9–13, i.e., the size of the aperture will depend upon the distance from the subject.

In presently known cameras which operate on the above described principle, the guide number of the source of artificial light is always the same, i.e., the camera can use an electronic flash unit with a predetermined guide number or another source of artificial light having the same guide number. Therefore, and if such known cameras were to be used with sources of artificial light having different guide numbers, they would have to be equipped with further resistor means to compensate for changes in guide number. Such further resistor means would be connected into or disconnected from the circuit of the output member 100 by a separate adjuster which would be manipulated when the operator would decide to change from operation with a first type of artificial light (a first guide number) to operation with a second type of artificial light (a second guide number). This would complicate the construction of the camera and would not allow for automatic adjustment in response to attachment of a selected source of artificial light. An important object of our present invention is to provide a camera which can be automatically set for operation in artificial light in response to attachment or readying of one of several sources of artificial light which may but need not have the same guide number. For example, the camera of the present invention may be constructed and assembled for operation with two sources of artificial light which respectively have a guide number 16 and a guide number 22. These guide numbers are quite customary in flash photography.

A camera which embodies one form of the present invention is illustrated in greater detail in FIGS. 2 and 3. In addition to various mechanical parts of the camera, FIGS. 2 and 3 further show certain electrical components, namely, those which are shown in FIG. 1 within a broken-line box marked EC. FIG. 1 further shows a source of electrical energy in the form of a battery 108, a capacitor 109, a resistor 110 which is needed when the camera is operated with a multiple flash bulb holder, and a synchronizing switch 111 which closes in automatic response to release of the shutter.

FIGS. 2 and 3 show a camera wherein the shutter includes an impeller 1 adapted to transmit impulses to a lever 3 which is biased by a return spring 2 and controls the position of two shutter blades (not shown). The exposure time will depend on the angular displacement of the lever 3 and is shorter if the angular displacement of the lever 3 is smaller. An annular selector 4 is biased by a spring 5 and tends to assume an idle position in which it abuts against a fixed stop 6. In such idle position, a bent-over portion or lug 4a serves to limit the angular displacement of the lever 3 and causes the shutter to furnish a short exposure time. For example, the lug 4a can limit the angular movement of the lever 3 in such a way that the time for making exposures in artificial light is set at $\frac{1}{125}$ second.

The selector 4 further comprises an arm or extension 4b which can cooperate with two resilient moving contacts 7 and 8. The contacts 7, 8 are connected in circuit with those resistors 9–13 which are singled out by the focus adjusting means. The focus adjusting means can connect the contacts 7, 8 with one, two or more resistors 9–13, depending on the distance from the subject. In the position shown in FIG. 2, the extension 4b bears against the contact 7 and keeps it away from a fixed contact 7a so that the circuit is open between the contacts 7, 7a which together form a first switch. The contact 8 is allowed to bear against a fixed contact 8a so that the switch including the contacts 8, 8a is closed. It will be noted that, in the position shown in FIG. 2, all of the resistors 9–13 are connected in circuit with the output member 100 of the moving coil instrument 102. This setting can correspond to a guide number 16 which is customary for electronic flash units. At the same time, the lug 4a of the selector 4 automatically sets the exposure time at $\frac{1}{125}$ second.

If the operator thereupon decides to replace the electronic flash unit with a multiple flash bulb holder ("Flashcube") of the type comprising four flash bulbs each located in front of a reflector and being indexible to place successive or selected flash bulbs into an optimum position for illumination of the subject, the multiple flash bulb holder displaces an actuating member or slide 14 against the opposition of a return spring 15, i.e., downwardly, as viewed in FIG. 2. The slide 14 changes the angular position of the selector 4 through the intermediary of a motion transmitting projection 14a which cooperates with a pin 4d provided on a projection or arm 4c of the selector 4. The latter turns in a clockwise direction whereby the extension 4b bears against the contact 8 and moves it away from the fixed contact 8a. The extension 4b then permits the contact 7 to reengage the fixed contact 7a. This disconnects the resistors 12 and 13 so that the circuit of the output member 100 includes one, two or three resistors 9–11, depending on the position of the slider 107. Consequently, the camera is now set to make exposures in artificial light produced by a source (multiple flash bulb holder) having a different guide number, e.g., the number 22. The angular displacement of the selector 4 causes its lug 4a to move away from the path of movement of the lever 3 so that the latter can be caused to perform a larger angular movement which corresponds to an exposure time of 1/30 of a second. This is a satisfactory exposure time for taking pictures with a "Flashcube." When the multiple flash bulb holder is detached from the camera, the slide 14 follows the bias of the return spring 15 and moves its motion transmitting projection 14a upwardly whereby the selector 4 follows the bias of the spring 5 and returns into abutment with the stop 6. The members 14, 105 can but need not form an integral unit; they may be connected with each other by a link train or the like so that displacement of the slide 14 invariably effects requisite displacement of the resetting member 105.

Figure 4:
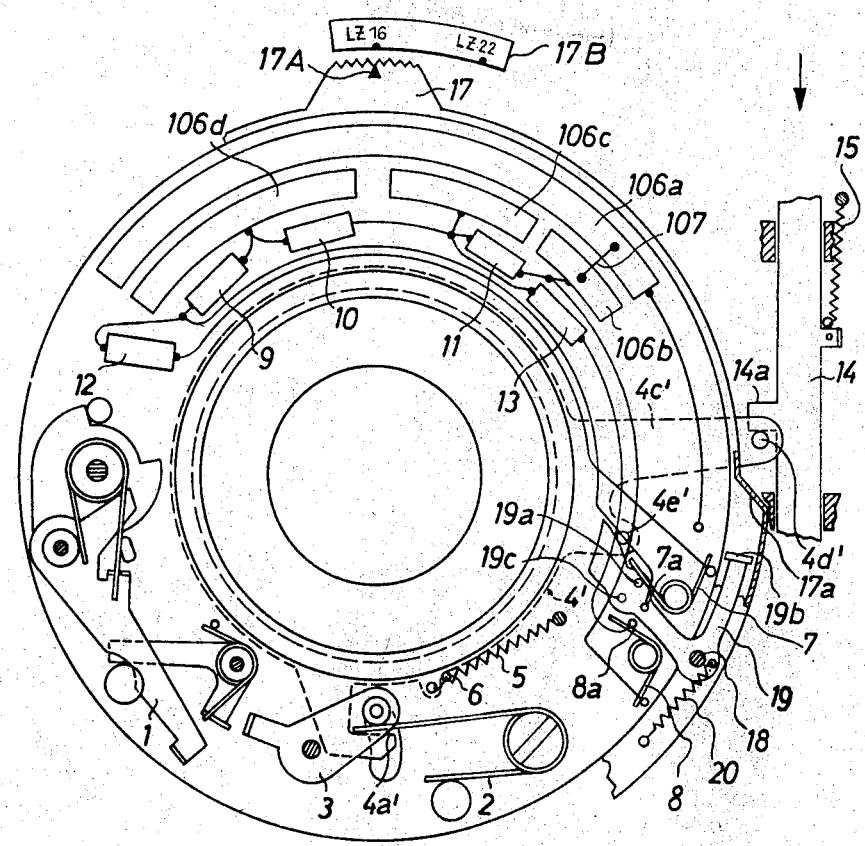
FIG. 4 is a fragmentary front elevational view of a modified camera.

FIG. 4 illustrates a portion of a second camera having a manually actuable setting member 17 which can select a desired guide number (LZ) by moving the index 17A into registry with the corresponding graduation on a fixed scale 17B without necessarily changing the exposure time. The setting member 17 resembles a ring and has a cam 17a which can turn a control lever 19 mounted on a fixed shaft 18 carried by the shutter housing. The lever 19 is biased by a helical spring 20 so that one of its arms bears against a post 4e' of a modified selector 4'. When the electronic flash unit (not shown) is moved to operative position, a trip 19a on the one arm of the control lever 19 maintains the moving contact 7 away from the fixed contact 7a. A second trip 19c of the lever 19 permits the moving contact 8 to bear against the fixed contact 8a. The graduation 16 which is singled out by the index 17A corresponds to the guide number of the electronic flash unit. The exposure time for operation with such electronic unit is 1/125 second. The exposure time is set by the portion 4a' of the selector 4' in the same way as described in connection with FIGS. 2 and 3.

If the electronic flash unit is replaced by a different source of artificial illumination, for example, by inserting a single flash bulb or a multiple flash bulb holder into a socket which is mounted in or on the camera body, the slide 14 changes the angular position of the selector 4' through the intermediary of the projection 14a, pin 4d' and arm 4c'. The post 4e' then turns the control lever 19 in a counterclockwise direction to move the trip 19c against the moving contact 8. The latter is disengaged from the fixed contact 8a but the trip 19a allows the moving contact 7 to return into engagement with the fixed contact 7a. At the same time, the selector 4' sets the shutter to furnish an appropriate exposure time, for example, 1/30 second.

It will be seen that the setting member 17 need not change its position if the electronic flash unit (guide number 16) is replaced by another flash unit, i.e., it is immaterial whether or not the graduation singled out by the index 17A indicates the guide number of that source of light which can displace the slide 14. The guide number of the multiple flash bulb holder or single flash bulb which moves the slide 14 downwardly may be 22. If such bulb or holder is removed, i.e., if the built-in flash unit is returned to inoperative position, the spring 15 moves the slide 14 upwardly and the camera is reset for operation with electronic flash (guide number 16).

If the user thereupon wishes to employ an electronic flash with a guide number 22, the setting member 17 is turned to place the index 17A into registry with the graduation 22. The cam 17a then engages a follower 19b of the control lever 19 and causes the latter to turn in a counterclockwise direction so that the spring 20 stores energy and the trip 19a releases the moving contact 7 whereas the other trip 19c separates the moving contact 8 from the fixed contact 8a. The resistors 12, 13 are disconnected from the output member of the moving coil instrument so that the range of resistances offered by the variable resistor means includes the resistance of the resistor 9 alone, the combined resistance of resistors 9, 10 or the combined resistance of resistors 9–11, depending on the position of the slider 107. The exposure time is 1/125 second, i.e., angular displacement of the member 17 does not affect the exposure time.

It is clear that the camera of FIGS. 1–4 can be modified without deparing from the spirit of the present invention. The mounting and design of switches including the contacts 7, 7a and/or 8, 8a can be changed to meet the space requirements in certain types of cameras. Furthermore, the invention can be embodied in cameras with other types of shutters; for example, the selector 4 or 4' could set an appropriate exposure time by changing the position of a rotary or otherwise movable member in the retard mechanism of a conventional shutter. Also, at least one of two or more different sources of artificial light can be permanently installed in or on the camera body. As stated before, and assuming that a built-in source of artificial light includes an indexible socket in or on the camera body and a multiple flash bulb holder whose plug is insertable into the socket, the guide number of such source can be accounted for in response to displacement of the slide 14 on attachment of the holder to the socket. Furthermore, the operative connection between the built-in or detachable source on the one hand and the exposure meter and shutter on the other hand can be modified in a number of ways; for example, the parts 14, 4 or 14, 4' can be replaced by a system of links or the like. Finally, the camera can be modified to effect automatic adjustment of the shutter and exposure meter in response to attachment of different electronic flash units. For example, each electronic flash unit can have a differently configurated or dimensioned connector which automatically resets the selector 4 or 4' in response to attachment to the camera body, i.e., the configuration and/or size of each connector will be indicative of the respective guide number. The connector may resemble a foot, a nipple or the like.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What is claimed as new and desired to be protected by Letters Patent is set forth in the appended claims:

1. In a photographic camera, a combination comprising a plurality of sources of artificial light each having a predetermined guide number and each having at least a portion thereof movable between operative and inoperative positions; exposure meter means built into the body of the camera and including an electric circuit comprising an output member movable between a plurality of positions each indicative of a different size of the diaphragm aperature, light sensitive means connectable with said output member to determine the latter's position during operation in daylight as a function of the intensity of scene light, and variable resistor means for furnishing a plurality of resistance ranges, one for each of said guide numbers, said resistor means being connectable with said output member to provide a resistance in the appropriate range and to determine the position of said output member during operation in artificial light as a function of the guide number of the selected source and as a function of the distance from the subject, said variable resistor means comprising two groups of fixed resistors; adjusting means for determining the resistance of said variable resistor means within said ranges as a function of the distance from the subject; resetting means for automatically disconnecting said output member from said light sensitive means and for connecting said output member with said resistor means in response to movement of at least one source to operative position; setting means movable by hand to a plurality of positions each of which is indicative of a different guide number; selector means movable by said setting means to select the resistance range of said variable resistor means as a function of the position of said setting means; control means receiving motion from said setting means; and a plurality of switches each arranged to connect one of said groups of resistors with said output member in response to actuation by trip means provided on said control means in a given position of said setting means.

2. A combination as defined in claim 1, wherein said control means comprises a lever turnable about a fixed axis and said setting means comprises cam means cooperating with follower means provided on said lever.

3. In a photographic camera, a combination comprising a plurality of sources of artificial light each having a predetermined guide number and each having at least a portion thereof movable between operative and inoperative positions; exposure meter means built into the body of the camera and including an electric circuit comprising an output member movable between a plurality of positions each indicative of a different size of the diaphragm aperture, light sensitive means connectable with said output member to determine the latter's position during operation in daylight as a function of the intensity of scene light, and variable resistor means for furnishing a plurality of resistance ranges, one for each of said guide numbers, said resistor means being connectable with said output member to provide a resistance in the appropriate range in response to movement of said portion of at least one selected source to operative position and to thus determine the positions of said output member during operation in artificial light as a function of the guide number of said selected source and as a function of the distance from the subject, said resistor means comprising a plurality of fixed resistors; adjusting means for determining the resistance of said variable resistor means within said ranges as a function of the distance from the subject; and resetting means for automatically disconnecting said output member from said light-sensitive means and for connecting said output member with said resistor means in response to movement of at least one source to operative position.

4. A combination as defined in claim 3, wherein said fixed resistors form two groups and further comprising selector means movable between two positions to respectively connect the one and the other of said groups with said output member.

5. A combination as defined in claim 4, further comprising a pair of switches one of which is opened by said selector means when the other switch is closed and when the selector means assumes one of its positions and vice versa, each of said switches being arranged to connect a different number of fixed resistors in circuit with said output member.

6. A combination as defined in claim 5, further comprising actuating means movable by one of said sources to thereby place said selector means into one of said positions.

7. A combination as defined in claim 3, further comprising adjustable shutter means and selector means for adjusting said shutter means in response to connection of said output member with said variable resistor means so that the shutter means is set to furnish an appropriate exposure time for operation with each of said sources.

8. A combination as defined in claim 7, wherein said selector means comprises a portion whose position determines the exposure time.

9. A combination as defined in claim 7, wherein one of said sources is constituted by an electronic flash unit and another of said sources comprises a flash bulb holder, and wherein that range of resistances which is provided by said resistor means in response to placing of said other source into operative position is narrower than the range provided in response to placing of said one source into operative position.

10. A combination as defined in claim 3, further comprising adjustable shutter means and selector means for adjusting said shutter means to furnish an appropriate exposure time in response to placing of at least one of said sources into operative position.

11. A combination as defined in claim 10, wherein one of said sources is constituted by an electronic flash unit and another of said sources is constituted by a second flash unit utilizing flash bulbs.

12. A combination as defined in claim 11, wherein said selector means is arranged to respectively adjust said shutter means to furnish shorter and longer exposure times in response to placing of said electronic flash unit and said second flash unit into operative position.

13. A combination as defined in claim 10, wherein said shutter means comprises impeller means and blade means movable in response to impulses furnished by said impeller means to assume a plurality of positions each of which corresponds to a different exposure time, said selector means comprising a portion movable to a predetermined position in which said blade means assumes one of said plurality of positions in response to an impulse from said impeller means, and actuating means for moving said portion of said selector means to said predetermined position in response to placing of one of said sources to operative position.

14. A combination as defined in claim 13, wherein said last mentioned source is a flash unit which utilizes flash bulbs.

15. A combination as defined in claim 3, further comprising setting means movable by hand to a plurality of positions each of which is indicative of a different guide number, and selector means movable by said setting means to select the resistance range of said variable resistor means as a function of the position of said setting means.

16. A combination as defined in claim 15, wherein said sources include a plurality of electronic flash units having different guide numbers.

References Cited

UNITED STATES PATENTS

| | | | |
|---|---|---|---|
| 3,204,541 | 9/1965 | Frost et al. | 95—11.5 XR |
| 3,283,681 | 11/1966 | Singer et al. | 95—11.5 XR |
| 3,285,149 | 11/1966 | Fahlenberg et al. | 95—11.5 XR |
| 3,318,215 | 5/1967 | Schiks | 95—11.5 |
| 3,406,619 | 10/1968 | Rentschler | 95—10 |

NORTON ANSHER, Primary Examiner

J. F. PETERS, JR., Assistant Examiner

U.S. Cl. X.R.

95—11.5, 64